Aug. 15, 1950 L. B. GREENLEAF ET AL 2,519,245

MAGNETIC RECORDING APPARATUS

Filed Oct. 20, 1944

Inventors:
Leland B. Greenleaf
and Earle L. Kent,

By Dawson Ooms and Booth,
Attorneys.

Patented Aug. 15, 1950 2,519,245

UNITED STATES PATENT OFFICE 2,519,245

MAGNETIC RECORDING APPARATUS

Leland B. Greenleaf and Earle L. Kent, Elkhart, Ind., assignors, by mesne assignments, to Armour Research Foundation of Illinois Institute of Technology, Chicago, Ill., a corporation of Illinois Application October 20, 1944, Serial No. 559,626

11 Claims. (Cl. 179—100.2)

This invention relates to magnetic recording apparatus and more particularly to apparatus for recording or reproducing sounds magnetically from a small wire.

In recording or reproducing apparatus of the type employing a magnetized wire, difficulty has been encountered in threading the wire through the apparatus when the wire supply reels are changed. For example, if recordings are to be made on a number of spools of wire it is necessary completely to rethread the machine after each recording is completed and the magnetized wire is removed therefrom. Similarly in reproducing apparatus after the record on one spool of wire has been reproduced and the spool is removed, it is necessary to thread the wire from the next spool before its record can be reproduced. These are both time consuming operations and further involve handling of the wire by an operator so that the wire may be broken or damaged as for example, by kinking it.

One of the objects of the present invention is to produce magnetic recording apparatus in which spools of wire can easily be inserted without requiring that the wire be threaded through the apparatus.

Another object of the invention is to provide magnetic recording apparatus in which a leader is permanently attached to the take-up spool of the apparatus and is left threaded through the recording or reproducing parts of the apparatus when the supply spool is removed.

Still another object is to provide magnetic recording apparatus in which the driving motor is shut off during a rewinding operation when the leader on the take-up spool starts to unwind therefrom.

The above and other objects and advantages of the invention will be more readily apparent from the following description, when read in connection with the accompanying drawing in which.

Figure 1:
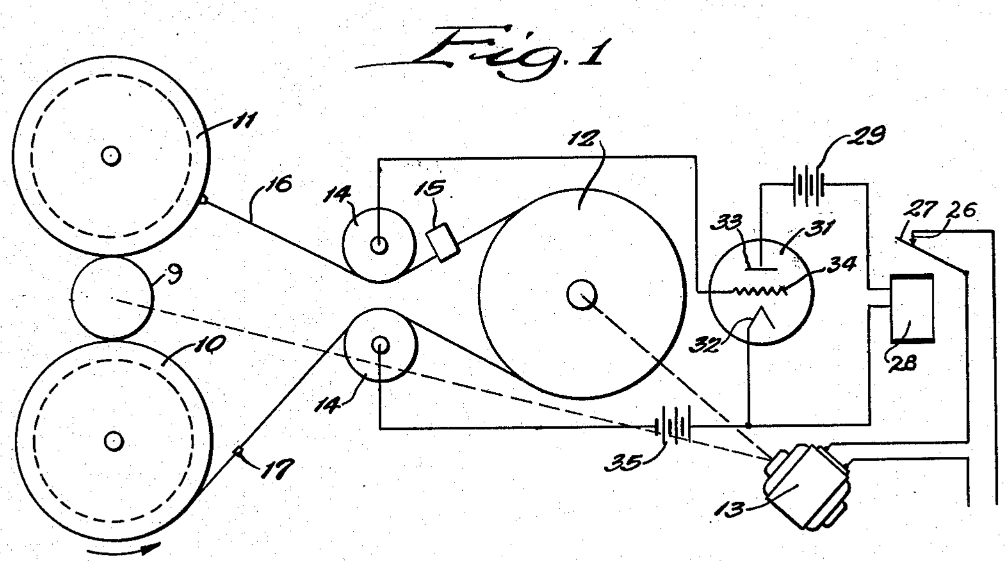
Figure 1 is a diagrammatic view of one form of apparatus embodying the invention.
Figure 2:
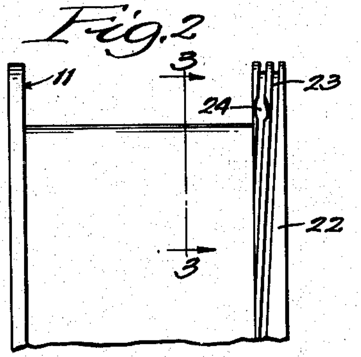
Figure 2 is an enlarged partial side view of the take-up reel of Figure 1.
Figure 3:
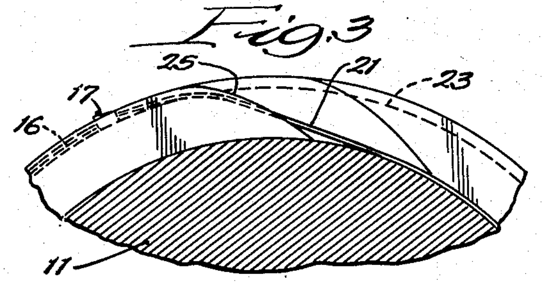
Figure 3 is an enlarged partial section on the line 3—3 of Figure 2.

The apparatus of Figure 1 comprises a supply spool 10 which may be removably mounted in the apparatus and which carries a fine metal wire of magnetic material on which a recording has been or is to be made. A permanently mounted take-up reel 11 is carried by the apparatus and is adapted to receive the wire from the supply spool during operation. The spools are adapted to be driven in any desired manner to transfer the wire from one to the other but preferably the speed of the wire is controlled by a driving pulley 12 driven by a motor 13 so that the speed of the wire will be substantially constant regardless of the amount which is wound on the spools. As shown diagrammatically the spools are driven by the motor 13 through a friction wheel 9 which engages the spools. The wire as shown passes over guide pulleys 14 through a magnetic head 15 which may either impress a magnetic record on the wire or which may be a reproducing head to take off a previous recording from the wire. It will be understood that in addition to the parts shown, erasing heads and sound producing or translating devices may be employed as is standard in the art.

According to the present invention, when a fresh supply spool is inserted in the machine it is unnecessary for the operator to thread the wire thereon over the various pulleys and through the head 15. For this purpose a leader 16 is permanently attached at one end to the take-up spool 11 and is of such a length that it will extend over the several pulleys and through the head and will terminate adjacent the supply spool 10. At its free end the leader carries a coupling 17 by which it may be connected to the wire on the supply spool. Instead of connecting the leader directly to the wire, it may be preferred to provide a leader permanently attached to the wire itself to which the coupling 17 may be connected.

Figures 4, 5:
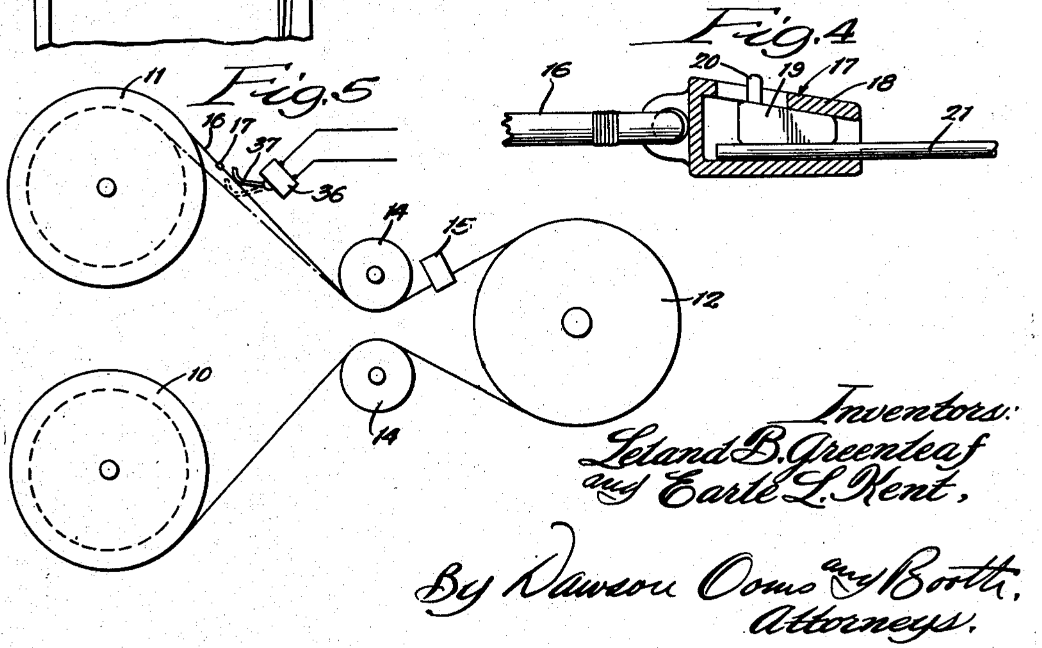
Figure 4 is an enlarged sectional view of a coupling.
Figure 5 is a diagram similar similar to Figure 1 showing an alternative motor control.

Any desired type of coupling for connecting the leader 16 to the wire or to a leader thereon may be employed. For example, a coupling of the type used in key chains or on various types of jewelry, such as necklaces, may be used satisfactorily. One type of preferred coupling is illustrated in Figure 4 and includes a hollow body 18 having a forwardly tapering opening therein. The body 18 is secured to the end of the leader 16 and has on its interior a slidable wedge 19 with a handle 20 thereon extending through a slot in the body. The wire or leader on the wire, as indicated at 21, may be inserted in the body and will be gripped by the wedge 19 securely to connect it to the leader. To release the wire or leader 21, the operator may move the finger 20 to the left, thereby moving the wedge into the large part of the body so that it will not grip the wire.

If the leader were wound on the main body of the take-up spool during a take-up operation, the wire which may be of a different diameter than one or both leaders might tend to jam around the leader or around the coupling. This might result in damage to the wire and it certainly produces unevenness of motion as the wire is wound on the take-up spool. In order to eliminate these difficulties the spool 11 is formed with an enlarged flanged end 22 to which the leader 16 is attached. The end 22 is formed with a spiral groove 23 in which the leader will be wound as the spool is turned. It will be understood that the width of the end 22 and the total length of the groove 23 are such as to receive the full length of the leader 16. At the point where the connector 17 will wind onto the end 22 an enlarged recess 24 is provided to receive the connector. Beyond this point the face of the end portion 22 may be cut to form a sloping shoulder 25. As the take-up spool is rotated to wind up the leader 16 and the wire, the leader will be wound in the groove 23 and the connector 17 will fall into the recess 24. Upon further rotation the wire or the leader connected thereto will wind on the sloping shoulder 25 and will thereafter be wound directly on the reduced body portion of the spool. Thus the wire may be wound smoothly on the spool without danger of jamming.

In rewinding the wire from the take-up spool 11 back onto the supply spool 10, it is desired to interrupt operation of the driving motor 13 before the leader is completely unwound from the take-up spool so that the apparatus will stop with the connector 17 in the desired position. It will be understood that the spools are driven by the motor 13 through a yielding drive mechanism which will permit slight variations in the speed thereof while the speed of the wire is held substantially constant by the driving pulley 12. As shown in Figure 1, the motor is controlled by a shut-off switch including a contact 26 and a switch arm 27 which opens the motor's circuit when the arm is pulled down. The arm 27 carries a magnetic core which will be attracted by a relay coil 28 when the coil is energized. The coil 28 is connected in circuit with a source of current such as a battery 29 and with a tube 31 having a cathode 32 connected to one side of the coil and a plate 33 connected to the other side of the coil. The tube is controlled by a grid 34 which is connected to one of the guide pulleys 14 and the other guide pulley 14 is connected through a biasing battery 35 to the cathode. The pulleys 14 in this construction are insulated from each other.

The leader 16 may be made of a non-conducting material while the wire on which the recording is, or is to be made, will be conductive. Therefore when the wire is wound on the spool 11, it will extend from the reel 10 around the pulleys 14 and guide pulley 12 to complete a circuit between the pulleys 14 through the wire itself. At this time the battery 35 will be connected to the grid 34 to bias it beyond cut off so that the tube 31 will not conduct and the coil 28 will be deenergized. As wire is rewound on the supply spool 10, the non-conducting leader eventually starts to unwind from the take-up spool 11 and when the leader engages the first of the guide pulleys 14, the circuit between the guide pulleys will be interrupted. At this time the negative bias will be removed from the grid 34 of the tube so that the tube will start to conduct and will energize the coil 28. The arm 27 will thereupon be pulled down to open the switch 26 and stop the operation of the motor. The apparatus will have sufficient inertia so that the leader 16 will continue to be unwound from the take-up spool 11 and the apparatus will coast to a stop with the connector 17 in substantially the position shown. If the reels and pulleys should attempt to coast beyond this position, their operation will be stopped by the leader itself when it is fully unwound from the take-up spool as shown.

An alternative motor control arrangement is shown in Figure 5 in which figure parts corresponding to like parts in Figure 1 are indicated by the same reference numerals. In this construction a switch 36 having an operating arm 37 is mounted adjacent the take-up spool 11 and is connected to the drive motor to control it. During the normal recording or reproducing operation and the first part of the rewinding operation the wire being withdrawn from the take-up spool will occupy the position shown by the dot dash line and the operating lever 37 will be in its dotted line position with the switch 36 closed. As soon as the leader 16 starts to unwind from the spool, the wire and leader will be moved to the full line position due to the fact that the leader is being unwound from the larger diameter end 22 of the spool. The switch operating lever 37 will therefore be moved to its full line position to open the switch 36 and interrupt the operation of the motor. It will be understood that control switches parallel to the switches 26 or 36 may be provided to control operation of the motor during a normal recording or reproducing operation.

While two embodiments of the invention have been shown and described in detail, it will be understood that these are illustrative only and are not to be taken as a definition of the scope of the invention, reference being had for this purpose to the appended claims.

What is claimed is:

1. Magnetic recording apparatus comprising a take up spool, a supply spool adapted to contain a wire, a magnetic head through which the wire travels between the spools, a leader permanently attached to the take up spool and of a length to extend therefrom through the head substantially to the supply spool, a detachable coupling on the leader for connecting the leader to the wire on the supply spool, a drive motor to wind wire from the supply spool on the take up spool and to rewind wire from the take up spool on the supply spool, and means engaging and controlled by the wire and leader at a point spaced from the take up spool to interrupt operation of the motor when the leader starts to unwind from the take up spool.

2. Magnetic recording apparatus comprising a supply spool adapted to contain a wire, a take up spool, a leader of non-conducting material permanently attached to the take-up spool, a connector on the leader for detachably connecting it to the wire, a head through which the wire and leader pass between the spools, spaced contact members engaging the wire and the leader, a drive motor to drive the spools, control means for the drive motor, and means for operating the control means connected to the contact members and responsive to electric connection and disconnection of the contact members by the wire and the leader.

3. Magnetic recording apparatus comprising a supply spool adapted to contain a wire, a take up spool, a leader of non-conducting material permanently attached to the take up spool, a connector on the leader for detachably connecting it to the wire, a head through which the wire and leader pass between the spools, spaced guide pulleys over which the wire and leader pass between the spools, a drive motor to drive the spools, and a control circuit for the drive motor connected to the guide pulleys to energize the motor when the wire engages both pulleys and to deenergize the motor when the leader engages one of the pulleys.

4. Magnetic recording apparatus comprising a supply spool adapted to contain a wire, a take up spool, a leader of non-conducting material permanently attached to the take up spool, a connector on the leader for detachably connecting it to the wire, a head through which the wire and leader pass between the spools, the take up spool including parts of different diameters on which the wire and the leader are wound, a drive motor, and a control switch for the motor having an operating part engaging the wire and leader adjacent the take up spool to operate the switch when the leader starts to unwind from the take up spool.

5. Magnetic recording apparatus comprising a supply spool adapted to contain wire, a take up spool having a reduced central portion with ends of increased diameter, a leader connected to one of the ends of the take up spool and adapted to be wound thereon, and a connector on the leader to connect it to the wire.

6. Magnetic recording apparatus comprising a supply spool adapted to contain wire, a take up spool having a reduced central portion with ends of increased diameter, a leader connected to one of the ends of the take up spool and adapted to be wound thereon, and a connector on the leader to connect it to the wire, said one end of the spool being formed with a spiral groove to receive the leader and having an enlarged recess to receive the connector so that the leader will be wound on the end and the wire will be wound on the reduced central portion.

7. A spool for magnetic recording apparatus comprising a cylindrical spool body having enlarged flanged ends, a leader permanently secured to one of the ends, and a connector on the leader, said one of the ends being formed with a spiral groove in which the leader may be wound and which terminates in a sloping portion leading to the spool body.

8. A spool for magnetic recording apparatus comprising a cylindrical spool body having enlarged flanged ends, a leader permanently secured to one of the ends, a connector on the leader to connect it to a wire to be wound on the spool, said one end of the body being formed with a spiral groove to receive the leader and having an enlarged recess to receive the connector so that the leader will be wound on the flanged end and the wire will be wound on the spool body.

9. In magnetic recording apparatus, a spool comprising a cylindrical spool body to receive a strand and having end flanges of greater diameter than the body, one of the end flanges being formed in its outer surface to receive a strand and having a sloping shoulder on its inner face leading to the spool body and a control device having an operating part engaging a strand on the spool adjacent to the spool to be moved by the strand as it moves along the shoulder.

10. In magnetic recording apparatus, a spool comprising a cylindrical spool body to receive a strand and having end flanges of greater diameter than the body, one of the end flanges being formed in its outer surface with a spiral groove to receive a strand, the groove terminating at the inner face of the flange in a sloping shoulder leading to the spool body to direct a strand from the flange to the spool body and a control device having an operating part engaging a strand on the spool adjacent to the spool to be moved by the strand as it moves along the shoulder.

11. In magnetic recording apparatus, a spool comprising a cylindrical spool body having end flanges of greater diameter than the body, one of the end flanges being formed in its outer surface with a spiral groove to receive a leader, and the groove having an enlarged recess therein to receive a connector on the leader.

LELAND B. GREENLEAF.
EARLE L. KENT.

REFERENCES CITED

The following references are of record in the file of this patent:

UNITED STATES PATENTS

| Number | Name | Date |
|---|---|---|
| 149,047 | Lovell | Mar. 31, 1874 |
| 821,708 | Edward | May 29, 1906 |
| 871,687 | Frink | Nov. 19, 1907 |
| 947,148 | Browne | Jan. 18, 1910 |
| 1,655,297 | Thornton | Jan. 3, 1928 |
| 1,909,277 | Jamar | May 16, 1933 |
| 2,212,798 | Sole | Aug. 27, 1940 |

FOREIGN PATENTS

| Number | Country | Date |
|---|---|---|
| 655,017 | Germany | Jan. 6, 1938 |